Figure 1:
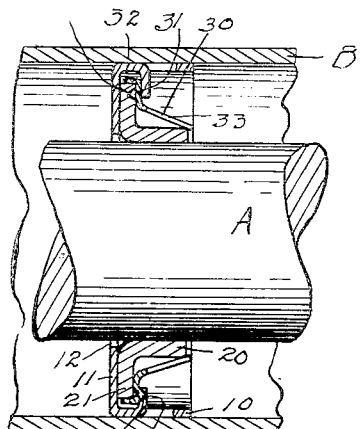

Dec. 5, 1933.   N. F. FRETTER   1,938,249
ANNULAR SEALING DEVICE
Filed March 14, 1931

Inventor-
Nathan F. Fretter,
By Bates, Goldrick & Teare,
Attys

Patented Dec. 5, 1933

1,938,249

UNITED STATES PATENT OFFICE 1,938,249

ANNULAR SEALING DEVICE

Nathan F. Fretter, Cleveland Heights, Ohio

Application March 14, 1931. Serial No. 522,703

11 Claims. (Cl. 288—1)

This invention relates to a sealing device adapted to be placed about a rotary shaft within a tubular housing to interrupt the flow of material without causing undue friction or wear on the shaft. The object of this invention is to provide such a device in a form which shall be very simple in construction, enabling its economical manufacture, and at the same time shall be effective in service. To that end, I provide an annular cage adapted to surround the shaft and bear against the tubular housing, a pliable annular packing member adapted to bear against the shaft, and an annular comb spring coacting with both the housing and packing member and serving to press the latter with proper force against the shaft. Means are provided to prevent the rotation of the packing relative to the cage.

Two embodiments of my invention are illustrated in the drawing hereof, and are hereinafter described and the essential novel features are summarized in the claims.

Figure 5:
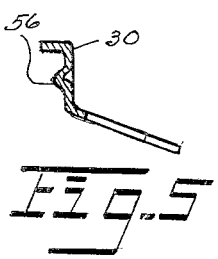
Figure 2:
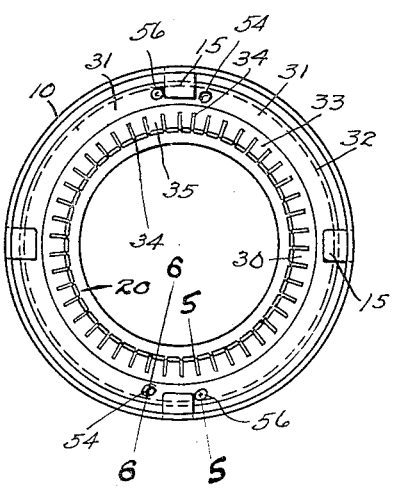
Figure 6:
Figure 3:
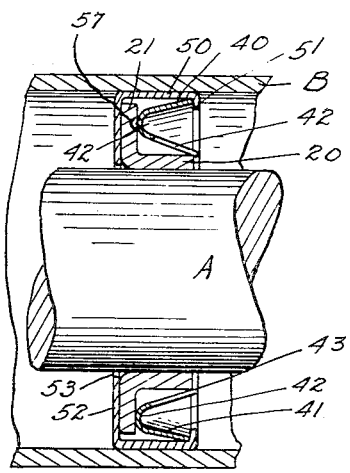
Figure 4:
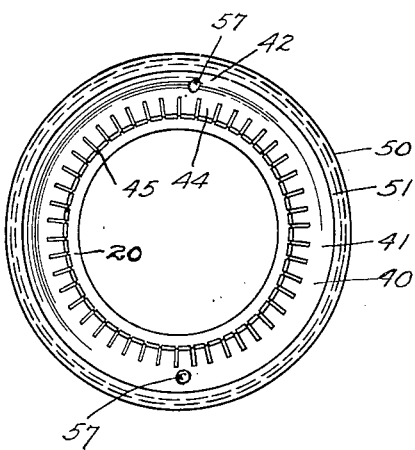

In the drawing, Fig. 1 is a longitudinal diametric section through a tubular housing and through my seal, this view showing a shaft in side elevation; Fig. 2 is an end view of the seal of Fig. 1; Fig. 3 is a longitudinal diametric section along a housing and through a modified form of my seal; Fig. 4 is an end elevation of the seal shown in Fig. 3; Figs. 5 and 6 are enlarged cross sections of the spring member on the corresponding numbered lines on Fig. 2.

In Figs. 1 and 3, A indicates a suitable shaft, B a tubular housing concentric therewith. Such shaft and housing may be used in a variety of installations, and to interrupt the passage of various materials. Thus I may mention for instance, the rear axle construction of an automobile, where my device occupying the annular space between the shaft and the housing and coacting with both of them prevents the passage of grease or oil along the space between them. In other classes of machinery, the device may be used to prevent the passage of dirt or grit or liquids or gases, according to the nature of the material within the housing.

In Figs. 1 and 2, 10 indicates the cage of my sealing device comprising a cylindrical portion having a radial flange 11 with a central opening 12 somewhat larger than the shaft. The exterior of the cylindrical portion makes a snug contact with the interior of the housing. 20 indicates the pliable packing member, which may be of leather or other suitable yielding material, and has a cylindrical portion adapted to hug the shaft and an outward extending radial portion 21. 30 indicates the annular comb spring.

In Figs. 1 and 2, the comb spring has a flat radial portion 31 terminating at its outer edge in a cylindrical flange 32, while at its inner edge, the radial portion merges into a conical part 33 which is slitted by radial slits 34 extending from the inner periphery to provide a number of leaf springs 35 arranged in an annular course, in other words, a comb spring formed as an annulus. The flat portion 31 of this spring and the cylindrical flange 32 lie against one radial side and against the outer edge of the flange 21 of the packing member 20, as shown in Fig. 1, while the leaf springs 35 bear at their free edges against the cylindrical portion at the packing near its free edge. The spring member 30 is held in this position by tongues 15 (four being shown) which are cut out of the cylindrical portion of the cage 10 and are bent inwardly against the flat portion 31 of the spring, thus at once clamping both the spring and the yielding packing in place in the cage.

It is desirable to provide positive means for preventing rotation of the packing 20 with reference to the cage or spring, so that if the packing is dry, resulting from the absence of lubricant, there will be no possibility of the shaft carrying the packing around with it and dislodging it from the cage and spring. To effect this, I provide in this embodiment, projections 54 on the spring 30 which are adapted to coact with the cage tongues 15 and prevent independent rotation, and I also provide, on this spring member, projections 56 in the opposite direction, which enter the packing flange and prevent rotation of it with reference to the spring. These projections 54 and 56 are illustrated in Figs. 5 and 6, and are readily made in the spring member from the action of a prick punch.

The parts of the embodiment above described may be cheaply constructed and are readily assembled by placing the packing and the spring within the cage before the tongues 15 are turned in, and then bending these tongues inwardly tightly against the spring. This produces an annular seal consisting of the cage, the packing and the spring all mounted and ready for insertion into the annular space within the housing.

In the embodiment shown in Figs. 3 and 4, the packing member 20, 21 is the same as heretofore described, but the cage and spring differ. In this form, the spring 40 is of an annular trough shape with flaring walls, thus providing a solid conical outer portion 41, a curved ridge 42 and a diverging inner portion 43 terminating in spring leaves 44 provided by the radial slits 45. The points of the spring bear, as before, against the free edge of the packing 20. The double portion of the spring, that is the ridge, bears against the radial flange 21 of the packing, and the other free edge of the solid portion 41 of the spring bears against the inner face of the cage 50 which is flanged inwardly at its extreme end as at 51 beyond the spring edge to retain the same. The other edge of the cylindrical portion of the cage is formed in the same manner as in the other embodiment, that is, it is flanged inwardly as at 52 alongside of the packing flange and terminating in the circular opening 53 around the shaft.

In this embodiment, I prevent inadvertent rotation of the packing with reference to the spring by making, on the doubled portion of the spring, projections 57 which enter the flange of the packing. The engagement of the extreme end of the spring with the cage flange 51 is sufficient to prevent rotation of the spring in the cage and the projections referred to prevent any rotation of the packing with reference to the spring, in case, for any reason, the shaft tends to drive the packing.

In the construction just described, like that of Figs. 1 and 2, the cage acts to hold an intermediate region of the spring against the radial flange of the packing member, while the free edge of the spring bears inwardly against the free edge of the cylindrical portion of the packing, and thus presses it with the desired force against the shaft.

The embodiment of Figs. 3 and 4, like the first embodiment, consists of simply three parts, it is cheaply made and readily assembled by placing the packing and spring in the cage and flanging inwardly the edge 51 thereof of the cage, thus producing a self contained unit adapted for installation as desired.

It will be seen that whichever form of my seal is employed there is an effective annular sealing member which may snugly engage the tubular housing of the size for which it is designed, and may cause the flexible packing to bear against the shaft with force enough to prevent passage of oil, grease or other material without producing undue wear or friction on the shaft.

I claim:—

1. A sealing device comprising a cage having a cylindrical portion and an inwardly extending radial portion, a packing having a cylindrical portion and an outwardly extending radial portion bearing against the radial portion of the cage, a spring in the form of an annular sheet metal member slitted radially around its inner periphery to provide spring fingers, said fingers bearing against the cylindrical portion of the packing and the solid portion of the spring member back of the fingers bearing against the radial portion of the packing, and an inwardly turned part of the cylindrical member of the cage bearing directly against the spring to clamp it in place against the radial portion of the packing.

2. In a sealing device, the combination of an annular cage having a cylindrical portion and an inwardly extending radial portion, a packing having a cylindrical portion and an outwardly extending radial portion, and a spring member bearing against the radial part and the cylindrical part of the packing, said cage having tongues cut out of its cylindrical portion and turned inwardly to bear against the spring member and clamp it and the packing between such tongues and the radial flange of the cage.

3. In a sealing device, the combination of an annular cage having a cylindrical portion and an inwardly extending radial portion, a packing having a cylindrical portion and an outwardly extending radial portion, an annular comb spring having a portion bearing against the radial part of the packing and its comb fingers against the cylindrical part of the packing and having at its outer edge a cylindrical flange overhanging the periphery of the radial portion of the packing for centering the spring and packing, said cage having inwardly projecting members bearing against the spring to clamp the spring and packing in place.

4. The combination of an integrally formed annular cage, an annular packing therein, a spring carried by direct contact with the cage against the packing, said spring having oppositely facing projections, one of which enters the packing, the other of which is adapted to engage the cage, whereby independent rotation of the three parts is prevented.

5. The combination of an annular cage L-shaped in cross section, an annular packing L-shaped in cross section, and an annular spring held by direct contact with the cage firmly against one extremity of the L-section packing and held yieldingly against the other extremity of the L-section packing.

6. An annular sealing device comprising three parts, a cage, a packing and a spring, said cage having a cylindrical portion and an inwardly extending radial portion, said packing having a cylindrical portion and an outwardly extending radial portion, said spring having an annular solid ring with a series of spring fingers converging inwardly along the frustum of a cone, the radial portion of the packing being held between the radial portion of the cage and the solid ring of the spring by inwardly bent parts of the cylindrical portion of the cage pressing against the ring.

7. In a sealing device, the combination of an annular cage having a cylindrical portion and an inwardly extending radial portion, a packing having a cylindrical portion and an outwardly extending radial portion, an annular comb spring having a portion bearing against the radial part of the packing and its comb fingers against the cylindrical part of the packing and having at its outer edge a cylindrical flange overhanging the periphery of the radial portion of the packing for centering the spring and packing, said cage having inwardly projecting members bearing against the spring to clamp the spring and packing in place, and said comb spring being locked against movement with respect to said cage.

8. In an annular sealing device, the combination of a cage having a cylindrical portion and an inwardly extending radial portion, a packing having a cylindrical portion and an outwardly extending radial portion, an annular ring pressing the radial portion of the packing against the radial portion of the cage, the annular ring restraining movement of the packing radially outward, the annular ring being retained in place by parts of the cylindrical portion of the cage bent in contact with the ring, and the annular ring having a series of spring fingers extending therefrom and pressing against the cylindrical portion of the packing.

9. In an annular sealing device the combination of a cage having a cylindrical portion and an inwardly extending radial portion, a packing having a cylindrical portion and an outwardly extending radial portion, an annular ring pressing the radial portion of the packing against the radial portion of the cage, the annular ring having a cylindrical flange embracing the outer periphery of the packing, said annular ring being secured against axial movement relative of the cage by interlocking with tongues bent over from the cylindrical portion of the cage, and said annular ring having a series of spring fingers extending therefrom and pressing against the cylindrical portion of the packing.

10. A sealing device comprising an annular cage, having a cylindrical portion, an inwardly extending radial portion, a packing having a cylindrical portion and an outwardly extending radial portion, the packing lying within the cage with the radial portion of the packing against the radial portion of the cage, and a spring in the form of an annular trough the inner portion of which is slitted to provide fingers bearing against the cylindrical portion of the packing and the ridge of which bears against the radial portion of the packing and the other outer edge of which bears against the cylindrical portion of the cage.

11. A sealing device comprising a cage having a cylindrical portion and an inwardly extending radial portion, a packing having a cylindrical portion and an outwardly extending radial portion bearing against the radial portion of the cage, and a spring in the form of an annular trough the inner portion of which bears against the cylindrical portion of the packing and the ridge of which bears against the radial portion of the packing and the other outer edge of which bears against the inner surface of the cylindrical portion of the cage and is held in place by an inward flange of the cage.

NATHAN F. FRETTER.